US011850694B2

United States Patent
Suyama (10) Patent No.: US 11,850,694 B2
(45) Date of Patent: Dec. 26, 2023

(54) DRIVE MECHANISM FOR TRANSFER TOOL

(71) Applicant: FANUC CORPORATION, Yamanashi (JP)

(72) Inventor: Shun Suyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 369 days.

(21) Appl. No.: 17/108,019

(22) Filed: Dec. 1, 2020

(65) Prior Publication Data

US 2021/0197334 A1 Jul. 1, 2021

(30) Foreign Application Priority Data

Dec. 25, 2019 (JP) .................................. 2019-233827

(51) Int. Cl.
*B25J 9/10* (2006.01)
*B23Q 7/04* (2006.01)

(52) U.S. Cl.
CPC ............... *B23Q 7/04* (2013.01); *B25J 9/101* (2013.01); *B25J 9/102* (2013.01)

(58) Field of Classification Search
CPC .... B21D 43/105; B21D 43/052; B21D 43/18; B25J 9/009; B25J 9/107; B25J 9/101; B25J 9/102; B25J 9/1065; B25J 9/109; B25J 9/12; B65G 47/902; B65G 47/91; B23Q 7/04
USPC ........... 74/490.01–490.5; 414/917, 732, 736, 414/751.1; 901/18, 20
See application file for complete search history.

(56) References Cited

U.S. PATENT DOCUMENTS

| 2,948,417 | A | * | 8/1960 | Haanes | ................ | B21D 43/105 |
| | | | | | | 414/733 |
| 8,307,732 | B2 | * | 11/2012 | Kinoshita | ............ | B25J 17/0266 |
| | | | | | | 901/19 |
| 2005/0262959 | A1 | * | 12/2005 | Angeles | ................ | B23Q 1/626 |
| | | | | | | 74/90.01 |

FOREIGN PATENT DOCUMENTS

| JP | S58-013988 U | 1/1983 |
| JP | S60-011789 U | 1/1985 |
| JP | 2004-299794 A | 10/2004 |
| JP | 2004299979 A | * 10/2004 |

(Continued)

*Primary Examiner* — Gerald McClain
(74) *Attorney, Agent, or Firm* — Studebaker & Brackett PC (57) ABSTRACT

A drive mechanism of a transfer tool configured to drive a swing axis and tilts the workpiece includes: a motor; a speed reducer including an output shaft arranged in parallel to the swing axis and configured to reduce speed of rotation of the motor; and a link mechanism configured to couple the swing axis with the output shaft, in which the link mechanism includes a first link portion fixed to the output shaft at a middle portion in a length direction thereof; a second link portion fixed to the swing axis at a middle portion in a length direction thereof; a third link portion that couples one end portions of the first link portion and the second link portion with each other in a rotatable manner; and a fourth link portion that couples other end portions of the first link portion and the second link portion with each other in a rotatable manner, in which the first link portion and the second link portion are arranged in parallel to each other, and in which the third link portion and the fourth link portion are arranged in parallel to a line segment linking a central axis of the output shaft with a central axis of the swing axis.

3 Claims, 6 Drawing Sheets (56) References Cited

FOREIGN PATENT DOCUMENTS

| JP | 2012-066357 A | 4/2012 |
| JP | 2018-130771 A | 8/2018 |

\* cited by examiner

DRIVE MECHANISM FOR TRANSFER TOOL

This application is based on and claims the benefit of priority from Japanese Patent Application No. 2019-233827, filed on 25 Dec. 2019, the content of which is incorporated herein by reference.

BACKGROUND OF THE INVENTION

Field of the Invention

The present invention relates to a drive mechanism for a transfer tool.

Related Art

For example, when pressing a workpiece such as a vehicle body panel, it has been known to perform pressing using a tandem press line made by aligning press machines in a row. In this case, a robot with a transfer tool attached to the tip of the arm may be used to transfer a pressed workpiece to the next press machine. The robot holds the workpiece by suction pads or the like attached to the transfer tool, and transfers the workpiece to the next press. In the transfer of such a workpiece, it is required that the holding operation and the holding release operation can be performed even when the workpiece is tilted. As one of the methods to meet this requirement, a method providing a swing axis to the transfer tool and changing the posture of a workpiece relative to the transfer tool around the swing axis has been known.

In the transfer of workpieces using a transfer tool, it is required to carry out the transfer between press machines at a high speed in order to improve the cycle time. In order to increase the transfer capacity, it is desirable to reduce the inertial force by forming the tip end of the transfer tool as light and compact as possible. Therefore, it is desired to secure a large transmission force to the swing axis, while suppressing an increase in the weight of the transfer tool, by realizing a large reduction ratio by using a small reducer in a small motor.

Japanese Unexamined Patent Application No. 2018-130771 discloses a transfer tool including a swing axis for tilting a workpiece, a motor, and a speed reducer for reducing the speed of rotation of the motor. The transfer tool further includes a drive gear fixed to the output shaft of the speed reducer, and a driven gear fixed to the shaft of the swing axis to transmit the rotation of the drive gear.

Patent Document 1: Japanese Unexamined Patent Application, Publication No. 2018-130771

SUMMARY OF THE INVENTION

In order for the drive gear and the driven gear to drive normally, an oil film (lubricating film) is required between the tooth surfaces in contact. If there is no oil film, since the contact between tooth surfaces becomes contact between metals, abnormal wear of the tooth surfaces occurs, leading to an abnormal operation such as misalignment. Examples of a means for ensuring an oil film include a method of immersing a gear in an oil bath, and a method of periodically applying oil which does not easily sheer off to a tooth surface. However, in a case of the method of immersing a gear in an oil bath, equipment must be made in a sealed structure so that oil does not scatter, a result of which the equipment becomes enormous, and assembly becomes difficult. The method of periodically applying the oil to the tooth surface is effective because, when the load acting on the gear is small or when the rotation speed is low, the oil film does not sheer off from the tooth surface and is held for a certain period of time. However, when the load acting on the gear is large or the rotational speed is high, temperature of the tooth surface becomes high, the durability of the oil also declines, and thus the oil film is difficult to be held, a result of which frequent oil coating work is required.

Furthermore, in order to amplify the torque of the motor in the speed reducer, in a case of mounting a gear to the output shaft of the speed reducer, the gear may have a larger size than expected. In addition, the motion of the swing axis only swings at a swing angle on the order of ±20 degrees, and not all of the gear teeth are used. As a result, only teeth within the swing range are always used, and hence, more of a load is constantly applied to the same teeth as the swing angle becomes smaller. Thus, the load on the teeth increases, while the unused teeth become useless.

In addition, a gear has a pressure angle due to its structure, so that a radial component of force is always generated during torque transmission. The component of force of the gear mounted to the output shaft of the speed reducer will be received by spindle bearings of the output shaft. In this case, depending on the capacity of the spindle bearings, the performance for the radial load affecting the spindle bearings is insufficient, even if there is a margin in the transmitted torque of the speed reducer. In order to cope with the radial load, it is necessary to select the spindle bearings of larger type, and there is a problem in that the equipment becomes large.

Therefore, a drive mechanism has been desired that can transmit the driving force of a motor to a swing axis without necessarily needing an oil bath or coating of oil, and can reduce a radial load on the output shaft of a speed reducer.

An aspect of the present disclosure relates to a drive mechanism of a transfer tool, the drive mechanism configured to drive a swing axis which is provided to the transfer tool that transfers a workpiece, and tilts the workpiece relative to the transfer tool, the drive mechanism including: a motor; a speed reducer including an output shaft arranged in parallel to the swing axis and configured to reduce speed of rotation of the motor; and a link mechanism configured to couple the swing axis with the output shaft, in which the link mechanism includes a first link portion fixed to the output shaft at a middle portion in a length direction thereof; a second link portion fixed to the swing axis at a middle portion in a length direction thereof; a third link portion that couples one end portions of the first link portion and the second link portion with each other in a rotatable manner; and a fourth link portion that couples other end portions of the first link portion and the second link portion with each other in a rotatable manner, in which the first link portion and the second link portion are arranged in parallel to each other, and in which the third link portion and the fourth link portion are arranged in parallel to a line segment linking a central axis of the output shaft with a central axis of the swing axis.

According to one aspect, it is possible to provide a drive mechanism of a transfer tool that can transmit a driving force of a motor to a swing axis without needing an oil bath or applying oil necessarily, and can reduce a radial load on the output shaft of a speed reducer.

DETAILED DESCRIPTION OF THE INVENTION

Figure 1:
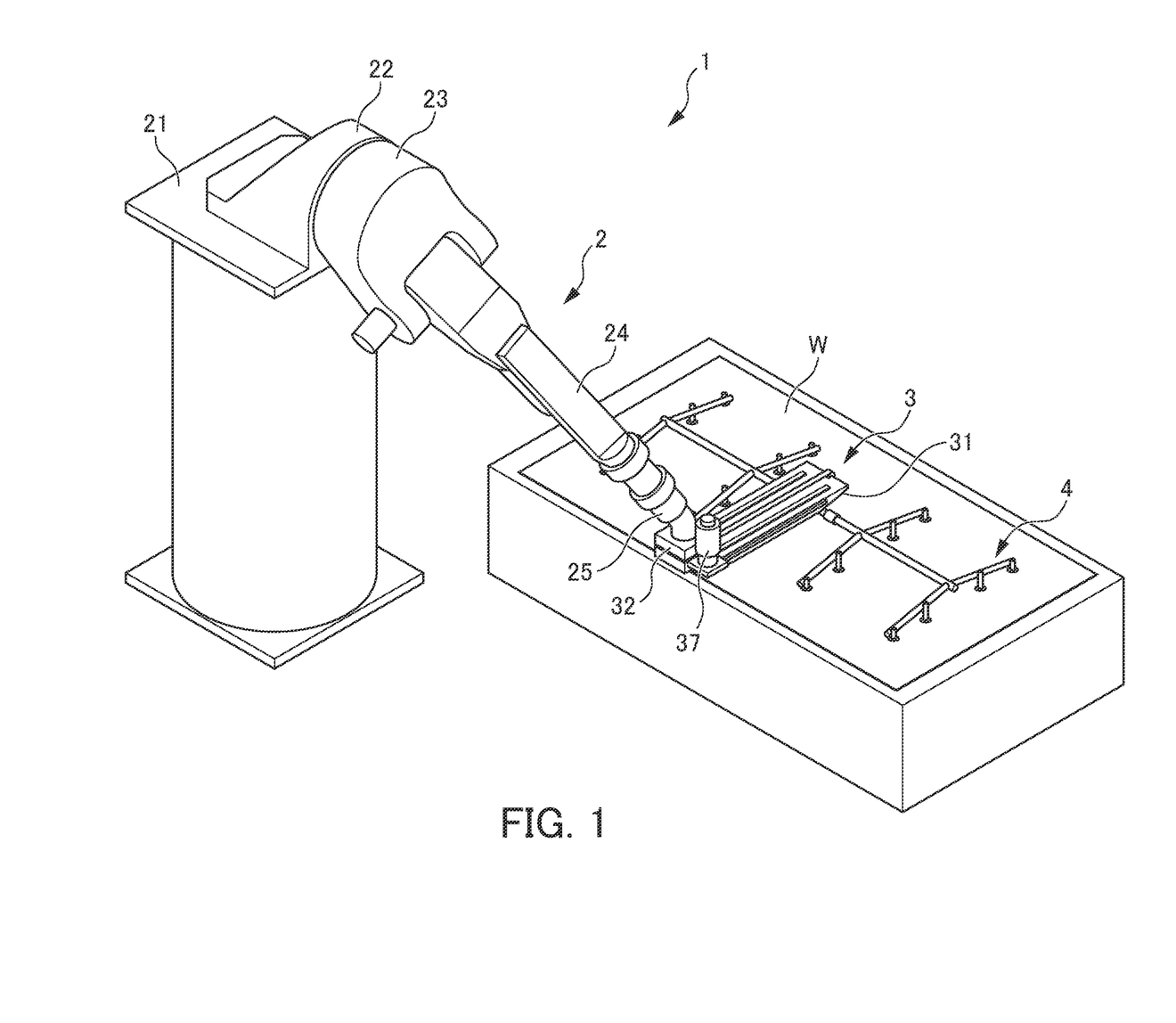
FIG. 1 is a perspective view showing a robot system including a drive mechanism of a transfer tool according to an aspect of the present disclosure.

Hereinafter, one aspect of the present disclosure will be described in detail with reference to the drawings. As shown in FIG. 1, a robot system 1 according to one aspect of the present disclosure holds a plate-like workpiece W such as a vehicle body panel by a robot 2, and transfers the workpiece W to, for example, a press machine (not shown). To hold and transport the workpiece W, a transfer tool 3 is attached to the tip end of an arm portion 24 of the robot 2.

The robot 2 is an articulated robot including a base 22 fixed to a support base 21, a pivot base 23 rotatably supported with respect to the base 22, an arm portion 24 swingably provided to the pivot base 23, and a wrist unit 25 provided at the tip end of the arm portion 24 in a manner capable of performing multi-axis rotation. The transfer tool 3 is attached to the tip end of the wrist unit 25.

Figure 2:
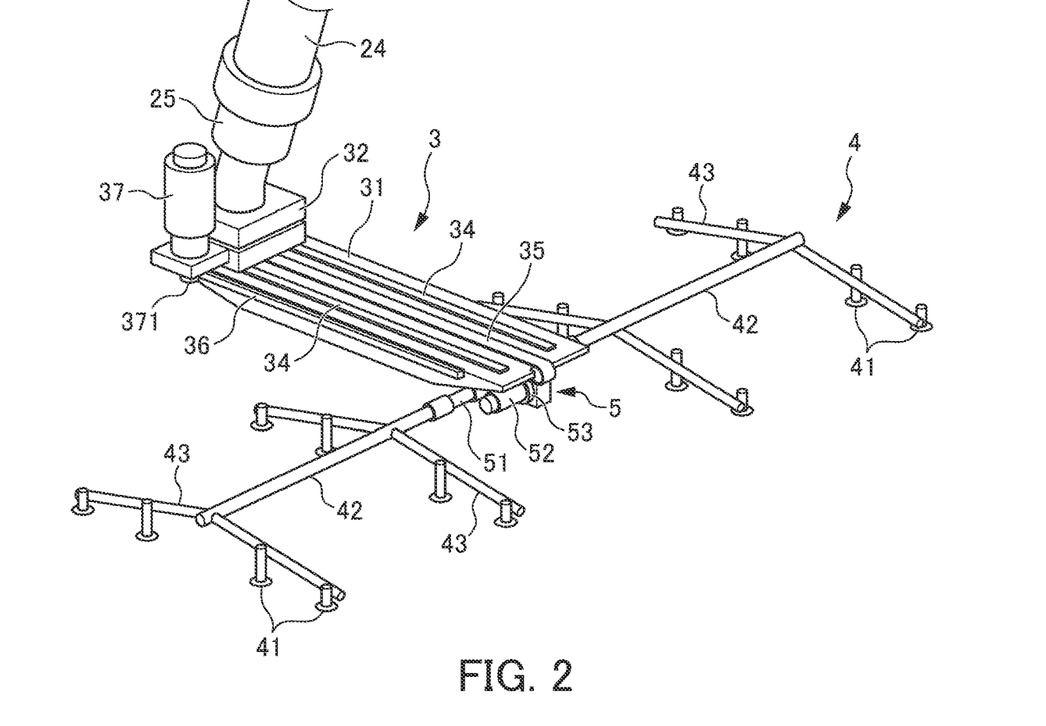
FIG. 2 is a perspective view showing the transfer tool in the robot system shown in FIG. 1.
Figure 3:
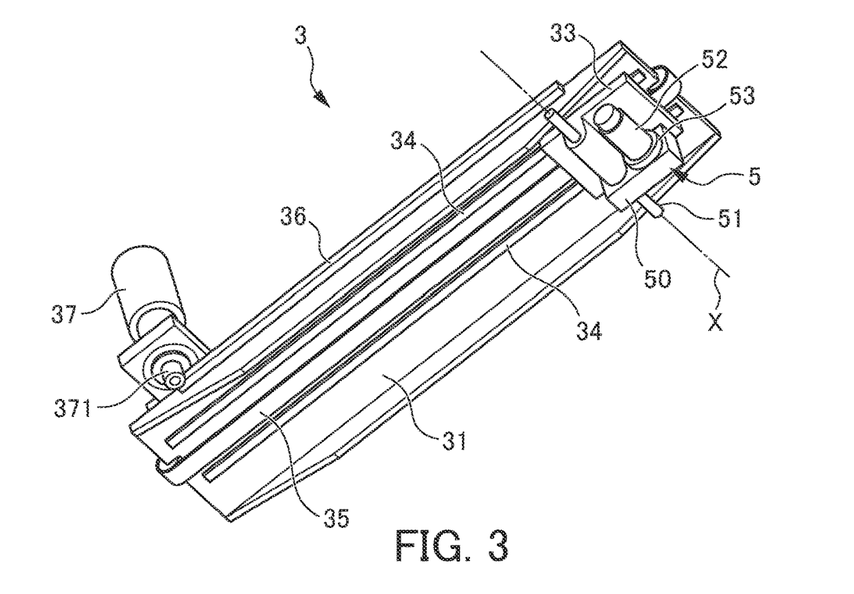
FIG. 3 is a perspective view of the transfer tool shown in FIG. 1 seen from the bottom side.

As shown in FIGS. 2 and 3, the transfer tool 3 includes a strip-shaped frame 31, a slider 32 disposed on a surface of the frame 31 (the surface on the wrist unit 25 side), and a slider 33 disposed on the back surface of the frame 31 (the opposite surface of the wrist unit 25). The sliders 32 and 33 are mounted on the front and back surfaces of the frame 31 so as to be movable along guide rails 34 provided along the length direction of the frame 31. The two sliders 32 and 33 are coupled by a belt 35 which is provided so as to be rotatable in the length direction of the frame 31.

On one end surface in the width direction of the frame 31, a rack gear 36 is provided along the length direction of the frame 31. As shown in FIG. 3, a pinion gear 371 is engaged with the rack gear 36. The pinion gear 371 is attached to the output shaft of a motor 37. The motor 37 is provided on the slider 32 disposed on the surface side of the frame 31. Therefore, when the motor 37 is driven, the slider 32 moves in one direction along the length direction of the frame 31. When the slider 32 moves in one direction, the belt 35 pulls the slider 33 to move the slider 33 in the opposite direction to the slider 32 along the length direction of the frame 31. That is, the two sliders 32 and 33 are provided on the frame 31 so as to move in opposite directions to each other along the length direction of the frame 31.

To the slider 33 disposed on the back surface of the frame 31, a holding tool 4 including a plurality of suction pads 41 for suctioning the workpiece W is attached so as to be swingable via a drive mechanism 5 attached to the lower surface of the slider 33 (the surface on the opposite side of the frame 31). More specifically, as shown in FIGS. 2 and 3, the drive mechanism 5 has a swing axis 51 extending along the width direction of the frame 31. The swing axis 51 protrudes on both sides in the width direction of the frame 31, and pillar portions 42 of the holding tool 4 are mounted coaxially on both sides in the width direction of the frame 31, respectively. A plurality of branch portions 43 extending in a direction perpendicular to the length direction of the pillar portion 42 extends from the pillar portion 42. The plurality of suction pads 41 are provided on the branch portion 43.

As shown in FIG. 3, the drive mechanism 5 includes a swing axis 51, a motor 52, a speed reducer 53 for reducing the speed of rotation of the motor 52, and a link mechanism 6 (not shown in FIG. 3). The output shaft 54 of the speed reducer 53 (not shown in FIG. 3) is arranged parallel to the swing axis 51, and is coupled to the swing axis 51 by the link mechanism 6. Therefore, when the motor 52 rotates in a predetermined angle range, the rotation of the motor 52 is reduced by the speed reducer 53, following which the rotation is transmitted to the swing axis 51 via the output shaft 54 of the speed reducer 53 and the link mechanism 6. Thus, the swing axis 51 is swung at a predetermined angle about the swing axis X shown in FIG. 3, tilting the workpiece W held by the holding tool 4.

Next, the link mechanism 6 will be described with reference to FIG. 4. The link mechanism 6 includes a first link portion 61 which is fixed to the output shaft 54 of the speed reducer 53, a second link portion 62 which is fixed to the swing axis 51, and a third link portion 63 and the fourth link portion 64 rotatably coupling both ends of the first link portion 61 and the second link portion 62, respectively. The first link portion 61, the second link portion 62, the third link portion 63, and the fourth link portion 64 are each formed of a metal rod extending in a straight line.

The first link portion 61 and the second link portion 62 have equal lengths, and are arranged in parallel with each other to constitute a set of parallel links. The first link portion 61 is arranged so as to be perpendicular to the length direction of the output shaft 54 (direction perpendicular to the plane of FIG. 4), and is fixed to the output shaft 54 at the middle portion in the length direction of the first link portion 61. The second link portion 62 is arranged so as to be perpendicular to the length direction of the swing axis 51 (the direction perpendicular to the plane of FIG. 4), and is fixed to the swing axis 51 at the middle portion in the length direction of the second link portion 62. More specifically, the first link portion 61 in the present embodiment is fixed to the output shaft 54 in the central portion 61c in the length direction, and the second link portion 62 is fixed to the swing axis 51 in the central portion 62c in the length direction.

The upper end portion 61a of the first link portion 61 (one end portion) and the lower end portion 61b (the other end portion) are arranged on a straight line around the output shaft 54. The upper end portion 62a of the second link portion 62 (one end portion) and the lower end portion 62b (the other end portion) are arranged on a straight line around the swing axis 51. The length of the upper end portion 61a side and the length of the lower end portion 61b side of the first link portion 61 around the output shaft 54 are equal to the length of the upper end portion 62a side and the length of the lower end portion 62b side of the second link portion 62 around the swing axis 51.

The third link portion 63 and the fourth link portion 64 have equal lengths, and are arranged in parallel with each other to constitute another set of parallel links. An end portion 63a disposed on the first link portion 61 side of the third link portion 63 is rotatably coupled to the upper end portion 61a of the first link portion 61 by a bearing 65. An end portion 63b disposed on the second link portion 62 side of the third link portion 63 is rotatably coupled to the upper end portion 62a of the second link portion 62 via a bearing 66. An end portion 64a disposed on the first link portion 61 side of the fourth link portion 64 is rotatably coupled to the lower end portion 61b of the first link portion 61 via a bearing 67. An end portion 64b disposed on the second link portion 62 side of the fourth link portion 64 is rotatably coupled to the lower end portion 62b of the second link portion 62 via a bearing 68.

Slide bearings or sealed type roller bearings can be used for the bearings 65, 66, 67, and 68. In particular, slide bearings with self-lubricating properties, such as oil-less bearings, for example, can average the assembly error because the gap can be taken larger compared to roller bearings. Furthermore, in a case in which the capacity of the bearing for receiving the load on the surface is insufficient, it is possible to cope with such a case by increasing the dimension of the bearing in the axial direction, and hence, it is possible to suppress an increase in size of the bearing in the radial direction.

Thus, the first link portion 61, the second link portion 62, the third link portion 63, and the fourth link portion 64 are coupled in this way, a result of which the third link portion 63 and the fourth link portion 64 are arranged parallel to the line segment L connecting the central axis 54a of the output shaft 54 with the central axis 51a of the swing axis 51. As the link mechanism 6 is viewed along the axial direction of the output shaft 54 and the swing axis 51, the linear segment L is a line segment which is perpendicular to the length direction of the output shaft 54 and the swing axis 51, and is the shortest line segment connecting the central axis 54a of the output shaft 54 with the central axis 51a of the swing axis 51.

It should be noted that, in the first link portion 61, the second link portion 62, the third link portion 63, and the fourth link portion 64, equal length indicates that the length functioning as the link mechanism 6 is equal. That is, the first link portion 61 and the second link portion 62 having the equal lengths indicates that the distance between the central axes of the bearings 65 and 67 in the first link portion 61, and the distance between the central axes of the bearings 66 and 68 in the second link portion 62 have the equal lengths. The third link portion 63 and the fourth link portion 64 having equal lengths indicates that the distance between the central axes of the bearings 65 and 66 in the third link portion 63, and the distance between the central axes of the bearing 67 and 68 in the fourth link portion 64 have equal lengths. However, equal lengths are not limited to equal lengths in a strict sense, and may include design tolerances of an extent that does not impair the function of the link mechanism 6.

Furthermore, in the first link portion 61, the second link portion 62, the third link portion 63, and the fourth link portion 64, being parallel is not limited to parallel in a strict sense. Furthermore, in the first link portion 61 and the second link portion 62, the central portion in the length direction is not limited to the central portion in the length direction in a strict sense. These may also include tolerances that are acceptable in design to the extent that does not impair the function of the link mechanism 6.

Figure 4:
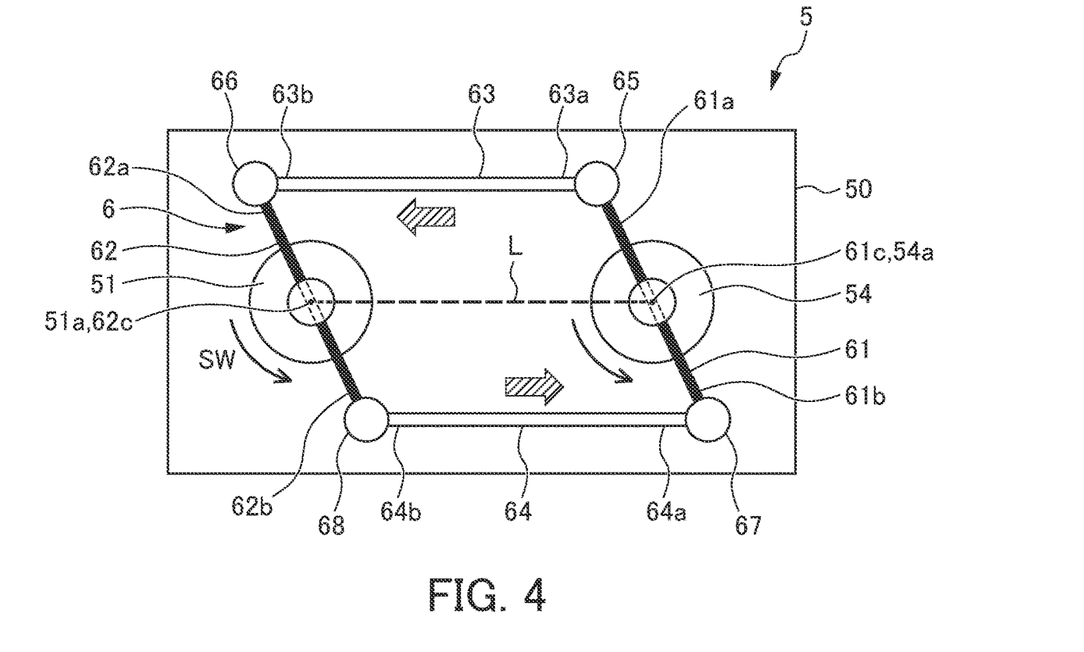
FIG. 4 is a schematic diagram showing an embodiment of a link mechanism in the drive mechanism.

In the drive mechanism 5 including the link mechanism 6 thus configured, in a case in which the output shaft 54 is rotated at a predetermined angle in the counterclockwise direction in FIG. 4 via the speed reducer 53 by driving the motor 52, for example, the first link portion 61 is tilted. Thus, the upper end portion 61a of the first link portion 61 is moved in a direction approaching the swing axis 51 (left side in FIG. 4), and the lower end portion 61b of the first link portion 61 is moved in a direction away from the swing axis 51 (right side in FIG. 4). In conjunction with this, the third link portion 63 rotates about the bearing 65 and 66, and is moved in a direction approaching the swing axis 51, and the fourth link portion 64 rotates about the bearings 67 and 68 and is moved in a direction away from the swing axis 51, a result of which the second link portion 62 is tilted in the same direction as the first link portion 61. Thus, the driving force of the motor 52 is transmitted to the swing axis 51, and the swing axis 51 is swung at a predetermined swing angle toward the swing direction SW along the counterclockwise direction. In this swinging operation, the degree of parallelism between the first link portion 61 and the second link portion 62 and the degree of parallelism between the third link portion 63 and the fourth link portion 64 do not substantially change.

Figure 5:
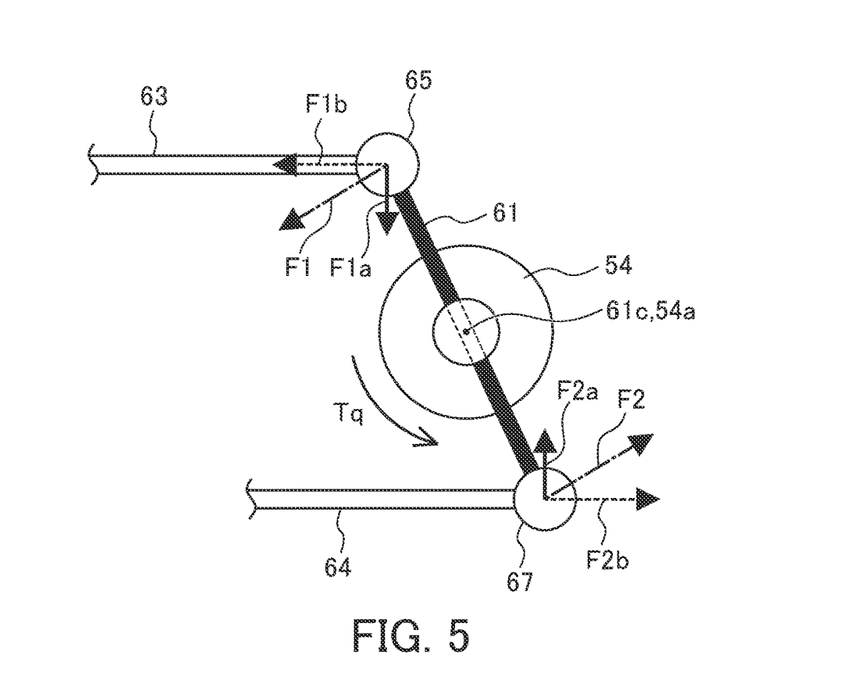
FIG. 5 is a diagram for explaining the direction of a load generated on a bearing in the link mechanism shown in FIG. 4.

Next, the operation of the link mechanism 6 in the drive mechanism 5 will be described with reference to FIG. 5. As shown in FIG. 5, when the rotation torque Tq in the counterclockwise direction is generated on the output shaft 54 by the drive of the motor 52, the radial loads F1 and F2 in the directions indicated by the arrows of the one-dot chain line are generated on the bearings 65 and 67, respectively. If these radial loads F1 and F2 are vector-decomposed, the radial loads F1 and F2 are composed of loads F1a and F2a in the vertical direction (up-and-down direction in FIG. 5) and loads F1b and F2b in the horizontal direction (left-and-right direction in FIG. 5), respectively. The loads F1a and F2a act in opposite directions, and the loads F1b and F2b also act in opposite directions.

Since the first link portion 61 is fixed to the output shaft 54 at the central portion 61c in the length direction, the length from the output shaft 54 to the bearing 65 and the length from the output shaft 54 to the bearing 67 is equal. Therefore, the loads F1a and F2a are the same loads, and the loads F1b and F2b are the same loads. The loads F1a and F2a act in opposite directions, and the loads F1b and F2b act in opposite directions. Therefore, the radial loads F1 and F2 acting on the bearings 65 and 67 cancel out each other. With such a configuration, the radial load on the output shaft 54 of the speed reducer 53 is completely cancelled out. Thus, the action of the radial load being completely cancelled out works similarly in the swing axis 51.

Figure 6:
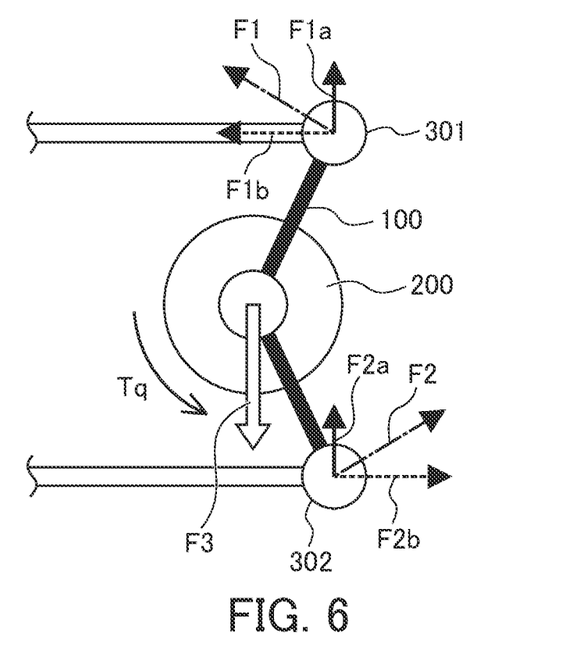
FIG. 6 is a diagram for explaining the direction of a load generated on a bearing when both ends of a link portion and an output shaft are not aligned, as a reference example.

On the other hand, as in the link portion 100 shown in FIG. 6, which is different from the first link portion 61 of the present disclosure, in a case in which the link portion 100 is formed in a V shape and both ends of the link portion 100 and the output shaft 200 are not aligned with each other, the loads F1a and F2a in the vertical direction when the radial loads F1 and F2 generated on the bearings 301 and 302 are vector-resolved act in the same direction. Therefore, the radial load corresponding to the sum of the loads F1a and F2a acts on the output shaft 200, and thus the radial load is not reduced. In this case, a reaction force F3 for preventing the rotation center from moving is generated in the output shaft 200 by the loads F1a and F2a generated in the bearings 301 and 302.

Figure 7:
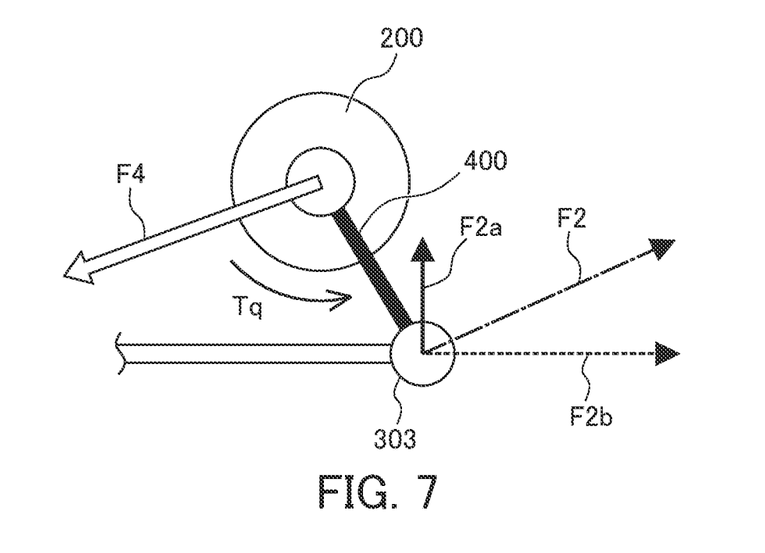
FIG. 7 is a diagram showing the direction of a load generated on the bearing when the end portion of the link portion is fixed to the output shaft, as a reference example.

Furthermore, as in the link portion 400 shown in FIG. 7 different from the first link portion 61 of the present disclosure, when the end portion of the link portion 400 is fixed to the output shaft 200, the load F4 in the opposite direction with the same magnitude as the radial load F2 generated on the bearing 303 acts on the output shaft 200, and thus the radial load is not reduced.

Thus, the drive mechanism 5 according to an aspect of the present disclosure transmits the driving force of the motor 52 to the swing axis 51 by the link mechanism 6 configured using two sets of parallel links as described above. Therefore, it is not necessary to use an oil bath or apply the oil required when transmitting the driving force of the motor to the swing axis by meshing the gears with each other as in the prior art, and thus the necessity for frequent maintenance is also reduced.

Furthermore, according to the drive mechanism 5 according to an aspect of the present disclosure, as compared with the case of transmitting the driving force by the meshing of the gears to each other, the radial load on the output shaft 54 of the speed reducer 53 is also reduced. Therefore, long life and a size reduction of the speed reducer 53 is expected. The load when the output shaft 54 rotates and the load when the swing axis 51 rotates are received at two points of the bearings 65 and 67 and the bearings 66 and 68, the load is dispersed, and the loads of the bearing 65, 66, 67, and 68 are also reduced. Therefore, the bearings 65, 66, 67, and 68 can also be miniaturized.

It is possible for the drive mechanism 5 for transmitting the driving force by the link mechanism 6 to easily take measures for regulating the swing angle of the swing axis 51 in a certain range, as compared with the case of transmitting the driving force by the meshing of the gears to each other. By regulating the swing angle of the swing axis 51 in a constant range, it is possible to prevent excessive rotation of the swing axis 51, i.e. excessive tilting of the workpiece W.

Figure 8:
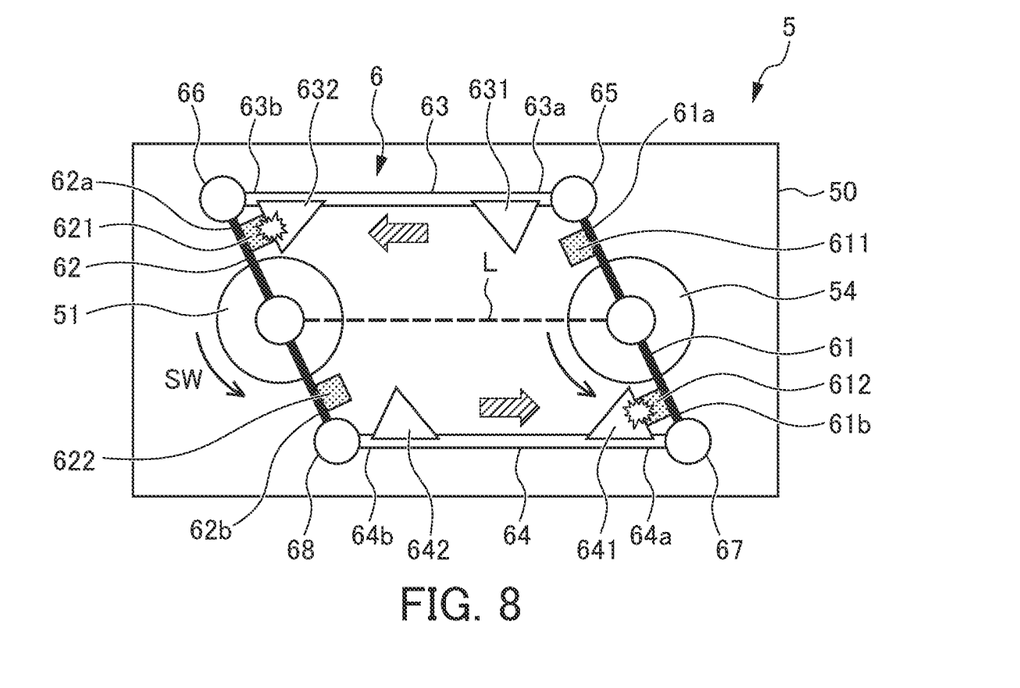
FIG. 8 is a schematic view of a stopper provided to the drive mechanism of the transfer tool shown in FIG. 1.
Figure 9:
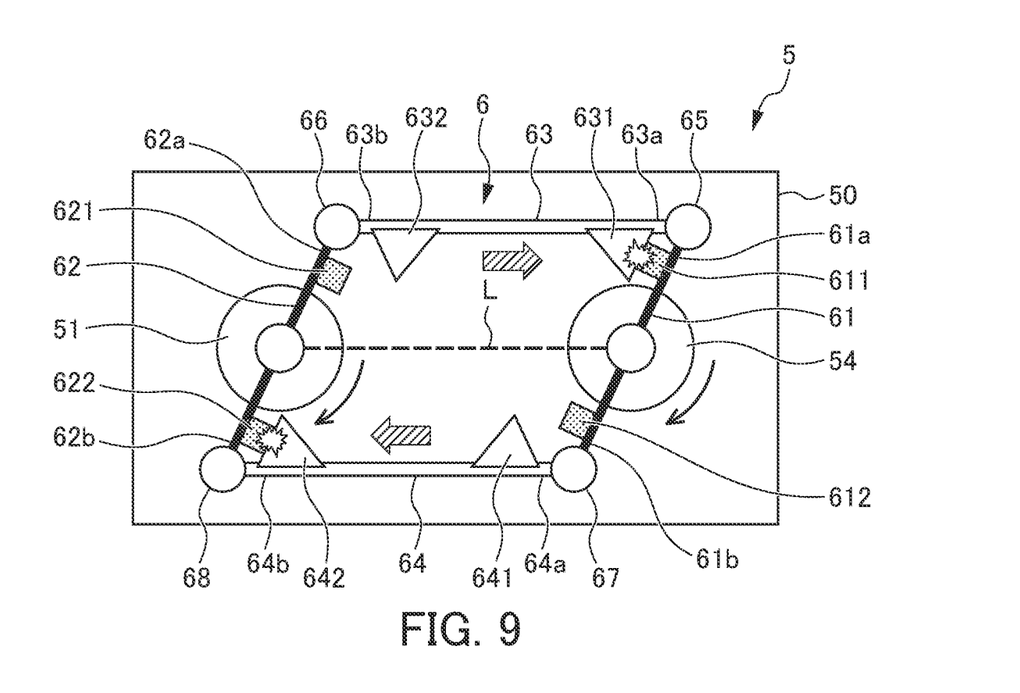
FIG. 9 is a schematic view showing a case in which the drive mechanism of the transfer tool shown in FIG. 8 is rotated in the opposite direction.

FIG. 8 and FIG. 9 show an example of countermeasures for regulating the swing angle of the swing axis 51 in a certain range. In FIGS. 8 and 9, stoppers 611 and 612 each having a square shape are attached to the surface facing the second link portion 62 at both end portions 61a and 61b of the first link portion 61. Stoppers 621 and 622 each having a square shape are attached to the surface facing the first link portion 61 at both end portions 62a and 62b of the second link portion 62. On the other hand, stoppers 631 and 632 each having a triangular shape are attached to the surface facing the fourth link portion 64 at both end portions 63a and 63b of the third link portion 63. Stoppers 641 and 642 each having a triangular shape are attached to the surface facing the third link portion 63 at both end portions 64a and 64b of the fourth link portion 64.

When the output shaft 54 is rotated in the counterclockwise direction beyond a certain angle, as shown in FIG. 8, the stopper 612 of the first link portion 61 hits the stopper 641 of the fourth link portion 64, the first link portion 61 and the fourth link portion 64 interfere with each other. At the same time, the stopper 621 of the second link portion 62 hits the stopper 632 of the third link portion 63, and the second link portion 62 and the third link portion 63 interfere with each other. Therefore, it is not possible for the output shaft 54 to further rotate in the counterclockwise direction, and thus the swing angle range in the counterclockwise direction of the swing axis 51 is limited.

When the output shaft 54 is rotated in the clockwise direction beyond a certain angle, as shown in FIG. 9, the stopper 631 of the stopper 611 hits the third link portion 63 of the first link portion 61, and thus the first link portion 61 and the third link portion 63 interfere with each other. At the same time, the stopper 622 of the second link portion 62 hits the stopper 642 of the fourth link portion 64, and thus the second link portion 62 and the fourth link portion 64 interfere with each other. Therefore, it is not possible for the output shaft 54 to further rotate in the clockwise direction, and thus the swing angle range in the clockwise direction of the swing axis 51 is limited.

Each stopper 611, 612, 621, 622, 631, 632, 641, and 642 may be provided detachably with respect to each link portion 61, 62, 63, and 64, or may be provided integrally and undetachably.

In FIGS. 8 and 9, the set of the stoppers 612 and 641 and the set of the stoppers 611 and 631 constitute a first swing angle range limiting portion for limiting the swing angle range of the swing axis 51 by the interference of the first link portion 61, and the third link portion 63 and the fourth link portion 64. Furthermore, the set of the stoppers 621 and 632, and the stoppers 622 and 642 constitute a second swing angle range limiting portion for limiting the swing angle range of the swing axis 51 by the interference of the second link portion 62, and the third link portion 63 and the fourth link portion 64. The link mechanism 6 is acceptable so long as it may be provided with at least one of the first swing angle range limiting portion or the second swing angle range limiting portion.

Figure 10:
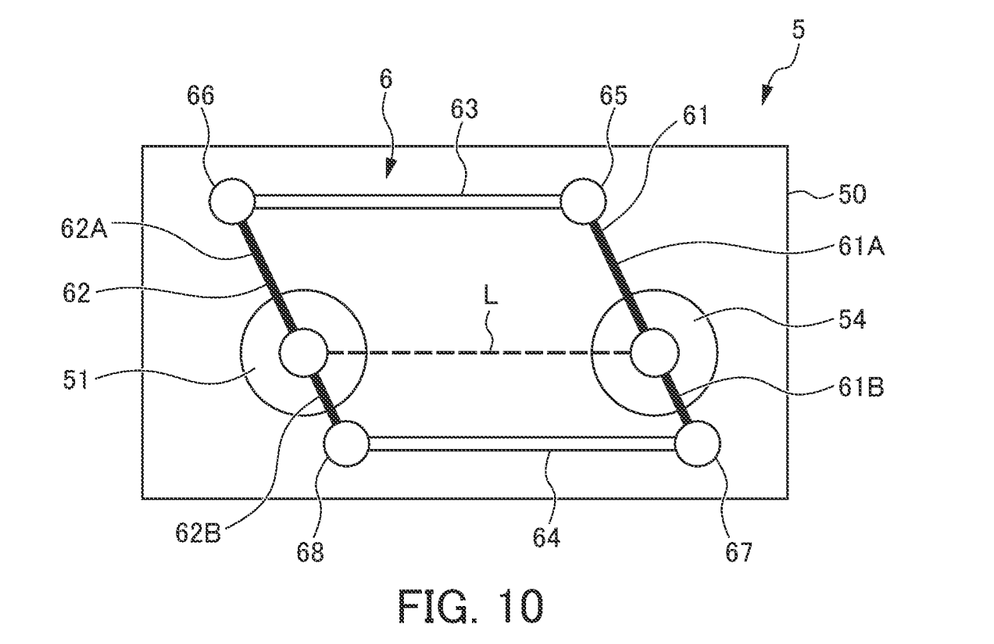
FIG. 10 is a schematic diagram showing another embodiment of the drive mechanism of the transfer tool.

In the above embodiments, the central portions 61c and 62c in the length direction of the first link portion 61 and the second link portion 62 are respectively fixed to the output shaft 54 and the swing axis 51; however, the present invention is not limited thereto. For example, as shown in FIG. 10, in the first link portion 61, the length of a first portion 61A from the output shaft 54 to the bearing 65 may be different from the length of a second portion 61B from the output shaft 54 to the bearing 67, and in the second link portion 62, the length of a first portion 62A from the swing axis 51 to the bearing 66 may be different from the length of a second portion 62B from the swing axis 51 to the bearing 68. However, the first portions 61A and 62A are equal in length, and the second portions 61B and 62B are also equal in length. Therefore, the third link portion 63 and the fourth link portion 64 are arranged in parallel.

Thus, in a case in which the central portions 61c and 62c in the length direction of the first link portion 61 and the second link portion 62 are not fixed to the output shaft 54 and the swing axis 51, respectively, the radial load acting on the output shaft 54 and the swing axis 51 is not completely cancelled out. However, this does not change the fact that the loads F1a and F2a in the vertical direction shown in FIG. 5 are in the opposite directions. Therefore, the effect of reducing the radial load acting on the output shaft 54 and the swing axis 51 can be acquired.

It should be noted that the drive mechanism 5 in the above embodiments has a housing 50, and accommodates the link mechanism 6 within the housing 50. However, the drive mechanism 5 may not have the housing 50.

EXPLANATION OF REFERENCE NUMERALS 3 transfer tool
5 drive mechanism
51 swing axis
52 motor
53 speed reducer
54 output shaft
51a, 54a central axis
6 link mechanism
61 first link portion
62 second link portion

61a, 62a upper end portion (one end portion)
61b, 62b lower end portion (the other end portion)
61c and 62c central portion
63 third link portion
64 fourth link portion
611,612,631,641 stopper (first swing angle range limiting portion)
621,622,632,642 stopper (second swing angle range limiting portion)
L line segment
W workpiece

What is claimed is:

1. A drive mechanism of a transfer tool, the drive mechanism configured to drive a swing axis which is provided to the transfer tool that transfers a workpiece, and tilts the workpiece relative to the transfer tool, the drive mechanism comprising:
   a motor;
   a speed reducer including an output shaft arranged in parallel to the swing axis and configured to reduce a speed of rotation of the motor; and
   a link mechanism configured to couple the swing axis with the output shaft,
   wherein the link mechanism includes
   a first link portion fixed directly and physically connected to the output shaft at a middle portion in a length direction of the first link portion to move with a rotation of the output shaft;
   a second link portion fixed to the swing axis at a middle portion in a length direction of the second link portion;
   a third link portion that couples one end portion of the first link portion and one end portion of the second link portion with each other in a rotatable manner; and
   a fourth link portion that couples another end portion of the first link portion and another end portion of the second link portion with each other in a rotatable manner,
   wherein the first link portion and the second link portion are arranged in parallel to each other,
   wherein the third link portion and the fourth link portion are arranged in parallel to a line segment linking a central axis of the output shaft with a central axis of the swing axis such that the speed of rotation of the motor is reduced by the speed reducer, and the rotation of the output shaft of the speed reducer is directly transmitted to the swing axis via the first, second, third, and fourth link portions of the link mechanism.

2. The drive mechanism of the transfer tool according to claim 1,
   wherein the first link portion is fixed to the output shaft at a central portion in the length direction, and
   wherein the second link portion is fixed to the swing axis at a central portion in the length direction.

3. The drive mechanism of the transfer tool according to claim 1, further comprising at least one of:
   a first swing angle range limiting portion that limits a swing angle range of the swing axis by interference of the first link portion with the third link portion and the fourth link portion; or
   a second swing angle range limiting portion that limits the swing angle range of the swing axis by interference of the second link portion with the third link portion and the fourth link portion.

* * * * *